3,435,047
PROCESS FOR PREPARING 3-AMINOISOXAZOLE DERIVATIVES

Issei Iwai and Norio Nakamura, Tokyo, Japan, assignors to Sankyo Company Limited, Tokyo, Japan
No Drawing. Filed Sept. 10, 1965, Ser. No. 486,518
Claims priority, application Japan, Sept. 14, 1964, 39/52,516, 39/52,517
Int. Cl. C07d 85/22; A01n 9/02
U.S. Cl. 260—307                             1 Claim

ABSTRACT OF THE DISCLOSURE

A ring synthesis is disclosed wherein 3-aminoisoxazoles are prepared by reacting propiolonitriles with alkaline hydroxylamine.

---

This invention relates to a novel process for preparing 3-amino-isoxazole derivatives. More particularly, it relates to a novel process for preparing the 3-aminoisoxazole derivatives having the formulae

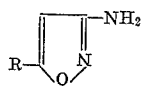

(I)

wherein R represents hydrogen; an alkyl group containing 1–5 carbon atoms such as methyl, ethyl, propyl, butyl or pentyl; or an unsubstituted or substituted phenyl group such as phenyl, p-, m- or o-nitrophenyl, p-, m- or o-aminophenyl, p-, m- or o-alkylphenyl for example p-methylphenyl, o-ethylphenyl, m-methylphenyl, o-n-propylphenyl or p-pentylphenyl, p-, m- or o-alkoxyphenyl for example p-methoxyphenyl, m-ethoxyphenyl or o-n-propoxyphenyl, or p-, m-, o-halogenophenyl for example p-, m- or o-bromophenyl or p-, m- or o-chlorophenyl and

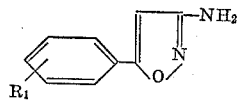

(II)

wherein $R_1$ represents hydrogen; halogen atom such as bromine, chlorine or iodine; an alkoxy group containing 1–5 carbon atoms such as methoxy, ethoxy, propoxy, butoxy or pentoxy; or an alkyl group containing 1–5 carbon atoms such as methyl, ethyl, propyl, butyl or pentyl.

The 3-aminoisoxazole derivatives having the above Formulae I and II are useful as an intermediate for the synthesis of sulfonamide compounds which are widely used as antibacterial agent.

It is an object of this invention to provide a novel and advantageous process for preparing the 3-aminoisoxazole derivatives having the above Formulae I and II which are useful intermediates for the synthesis of numerous valuable antibacterial agents.

Other objects of this invention will become apparent as the description of this invention proceeds.

Heretofore, as the process for the preparation of 3-aminoisoxazole derivatives, the process claimed and disclosed in Japanese Patent No. 290,449, No. 303,133 and No. 303,134 has been known. The above prior process involves the steps of reacting acylpyruvic acid alkyl ester with hydroxylamine hydrochloride to form 5-alkyl-3-carbalkoxy-isoxazole, reacting the latter compound with ammonia to form 5-alkyl-3-isoxazole carboxamide and treating the latter compound with alkali metal hypohalite and potassium hydroxide to produce the desired 3-aminoisoxazole derivatives.

As a result of various studies in order to find out a commercially advantageous process for preparing 3-aminoisoxazole derivaties, it has now been unexpectedly found that 3-aminoisoxazole derivative can be easily obtained in a high yield by reacting propiolonitrile derivative or β-halogenocinnamonitrile derivative with hydroxylamine in the presence of an alkali metal hydroxide.

According to the process of this invention, the 3-aminoisoxazole derivatives having the above Formulae I and II can be obtained by reacting a compound selected from the class of the propiolonitrile derivative having the formula

(III)

wherein R is as defined above and the 3-bromo-cinnamonitrile derivative having the formula

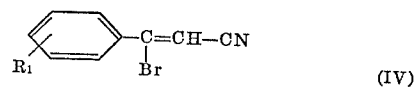

(IV)

wherein $R_1$ is as defined above with hydroxylamine in the presence of an alkali metal hydroxide.

In carrying out the process of this invention, where the propiolonitrile derivative having the above Formula III is employed as a starting material, the starting propiolonitrile is reacted with hydroxylamine in the presence of an alkali metal hydroxide and, optionally, in the presence of a suitable solvent. Though it is not essential in the reaction to employ a suitable solvent, it is desirable to employ such suitable solvent as water, water-miscible organic solvent, for example, alcohols, dioxane, tetrahydrofuran and the like or a mixture thereof and, if employed, among others, aqueous alcohols for example aqueous methanol or aqueous ethanol are most preferable. Suitable alkali metal hydroxide to be employed are sodium, potassium and lithium hydroxides and sodium hydroxide or potassium hydroxide is most preferable. The reaction time and temperature are not critical features of this invention. Generally speaking, the reaction is usually carried out at a temperature ranging from above room temperature or about 20° C. to a reflux temperature of the solvents employed. The reaction time will depend upon the reaction temperature employed and the reaction is generally carried out for about 1–20 hours, and preferably at about 20–60° C. for about 11–18 hours. The reagent, hydroxylamine, may be in the form of a free base or an acid addition salt, but practically its acid addition salt such as hydrochloride, sulfate and the like is most preferable. After completion of the reaction, the reaction product having the above Formula I may be recovered from the reaction mixture and purified by any of conventional methods. For instance, the reaction mixture is extracted with a suitable extract solvent for example ether, the solvent is distilled off from the extract and the residue is recrystallized from a suitable solvent for example aqueous ethanol to obtain the desired product in a purified form. The above extract may also be extracted with aqueous acid for example aqueous hydrochloric acid, the acid extract neutralized with a suitable alkaline substance for example sodium hydroxide and the end product thus separated recrystallized from a suitable solvent to obtain the pure end product. The starting propiolonitrile derivative where R is a substituted phenyl is novel compound and may be prepared from the corresponding acetylene by the procedure similar to that appeared in Annales de Chimique et de Physique, vol. 4, (9), 28 (1915).

In carrying out the process of this invention, where the β-bromo-cinnamonitrile having the above Formula IV is employed as a starting material, the reaction may be satisfactorily conducted in the same manner as in case of the above-mentioned propiolonitrile. The reaction time and temperature and other reaction conditions may also be similar to those of the propiolonitrile. In this case, there are obtained as reaction product the 3-aminoisoxazole derivatives having the above Formula II. Likewise, the reaction product having the Formula II may be recovered and purified by a conventional method. The starting substituted β-bromocinnamonitrile derivative is novel compound and may be prepared by reacting the corresponding phenylacetylene with cyanogen bromide in the presence of aluminum bromide.

The following examples are given only for the illustration of this invention, and not for the purpose of limiting the scope thereof.

EXAMPLE 1

Preparation of 3-aminoisoxazole

To a solution of propiolonitrile, prepared from 5.0 g. of propiolamide and 15 g. of phosphorus pentachloride, in 40 ml. of ethanol is added with ice-cooling a solution of 12.1 g. of hydroxylamine hydrochloride in 50 ml. of a 10% aqueous sodium hydroxide solution. The mixture is allowed to stand at room temperature overnight. Thereafter, the reaction mixture is saturated with sodium chloride, the saturated mixture is extracted several times with ether and the combined ether extract is dried over anhydrous sodium sulfate followed by removal of the ether to give 3.9 g. of 3-aminoisoxazole, boiling at 75–76° C./4 mm. Hg. The corresponding benzoate melts at 147–148° C. The yield of a free base is 66%, based on the starting amide.

*Analysis.*—Calculated for $C_3H_4ON_2$: C, 42.85; H, 4.80; N, 33.32. Found: C, 43.20; H, 4.91; N, 32.89.

EXAMPLE 2

Preparation of 3-amino-5-methylisoxazole

To a solution of 13.0 g. of tetrolonitrile in 200 ml. of ethanol is added a solution of 16.6 g. of hydroxylamine hydrochloride in 200 ml. of a 15% aqueous sodium hydroxide solution. The mixture is allowed to stand at room temperature overnight. Thereafter, the reaction mixture is extracted several times with ether, the combined ether extract is dried over anhydrous sodium sulfate, the ether is distilled off and then the residue is chromatographed on alumina. The crystalline substance eluted with benzene is recrystallized from a mixture of benzene and n-hexane to give 13.9 g. of 3-amino-5-methylisoxazole, melting at 60–61° C. Yield: 71%. The mixed melting point in admixture with an authentic sample shows no depression.

EXAMPLE 3

Preparation of 3-amino-5-phenylisoxazole

To a solution of 1.90 g. of phenylpropiolonitrile in 30 ml. of ethanol is edded a solution of 5.4 g. of hydroxylamine hydrochloride in 40 ml. of a 10% aqueous sodium hydroxide solution. The mixture is allowed to stand at room temperature overnight. Thereafter, the reaction mixture is extracted twice with ether, the combined ether extract is dried over anhydrous sodium sulfate and the ether is distilled off. The residue is dissolved in 10% aqueous hydrochloric acid and the insoluble material is filtered off from the resulting solution. The acidic filtrate is neutralized with an aqueous sodium hydroxide solution, the crystalline substance thus separated is recovered by filtration and recrystallized from aqueous ethanol to give 1.65 g. of 3-amino-5-phenylisoxazole as needles melting at 137–138° C. Yield: 70%.

*Analysis.*—Calculated for $C_9H_8ON_2$: C, 67.48; H, 5.03; N, 17.49. Found: C, 67.60; H, 5.15; N, 17.64.

EXAMPLE 4

Preparation of 3-amino-5-p-methoxyphenylisoxazole

To a solution of 6.5 g. of p-methoxyphenylpropiolonitrile in 120 ml. of ethanol is added a solution of 3.5 g. of hydroxylamine hydrochloride in 120 ml. of a 10% aqueous sodium hydroxide solution. The mixture is allowed to stand at room temperature overnight. Thereafter, the reaction mixture is extracted several times with ether, the combined ether extract is washed with water and dried over anhydrous sodium sulfate. The ether is distilled off and the residue is again dissolved in ether. The ether solution is extracted with 10% aqueous hydrochloric acid. The acid extract is made alkaline with aqueous sodium hydroxide and the alkaline solution is extracted with ether. Then, the ether extract is dried over anhydrous sodium sulfate, the ether is distilled off and finally the residue is recrystallized from aqueous ethanol to give 5.4 g. of 3-amino-5-p-methoxyphenylisoxazole as needles melting at 171–172° C. Yield: 77%.

*Analysis.*—Calculated for $C_{10}H_{10}O_2N_2$: C, 63.15; H, 5.30; N, 14.73. Found: C, 62.88; H, 5.30; N, 14.54.

EXAMPLE 5

Preparation of 3-aminoisoxazole

To a solution of propiolonitrile, prepared from 6.0 g. of propiolamide and 50 g. of phosphorus pentachloride, in 45 ml. of ethanol is added with ice-cooling a solution of 14.7 g. hydroxylamine hydrochloride in 60 ml. of a 10% aqueous sodium hydroxide solution. The mixture is allowed to stand at room temperature overnight. Thereafter, the reaction mixture is saturated with sodium chloride, the saturated mixture is extracted several times with ether and the combined ether extract is dried over anhydrous sodium sulfate followed by removal of ether to give 3.4 g. of 3-aminoisoxazole, boiling at 75–76° C./4 mm. Hg. The corresponding benzonate melts at 147–148° C. The yield of a free base is 47%.

*Analysis.*—Calculated for $C_3H_4ON_2$: C, 42.85; H, 4.80; N, 33.32. Found: C, 43.20; H, 4.91; N, 32.89.

EXAMPLE 6

Preparation of 3-amino-5-methylisoxazole

To a solution of 13.0 g. of tetrolonitrile in 300 ml. of ethanol is added a solution of 55.6 g. of hydroxylamine hydrochloride in 480 ml. of a 15% aqueous sodium hydroxide solution. The mixture is allowed to stand at room temperature overnight. Thereafter, the reaction mixture is extracted with ether, the ether extract is dried over anhydrous sodium sulfate, the ether is distilled off and then the residue is recrystallized from a mixture of benzene and n-hexane to give 10.5 g. of 3-amino-5-methylisoxazole, melting at 60–61° C. Yield: 53.6%. The mixed melting point in admixture with an authentic sample shows no depression.

EXAMPLE 7

Preparation of 3-amino-5-p-methoxyphenylisoxazole

To a solution of 9.4 g. of p-methoxyphenylpropiolonitrile in 250 ml. of ethanol is added a solution of 12.5 g. of hydroxylamine hydrochloride in 250 ml. of a 10% aqueous sodium hydroxide solution. The mixture is allowed to stand at room temperature overnight. Thereafter, the reaction mixture is twice extracted with ether, the combined ether extract is washed with water and dried over anhydrous sodium sulfate. The ether is distilled off and the residue is again dissolved in ether. The ether solution is extracted with 10% aqueous hydrochloric acid. The acid extract is made alkaline with aqueous sodium hydroxide and the alkaline solution is extracted with ether. Then, the ether extract is dried over anhydrous sodium sulfate, the ether is distilled off and finally the residue is recrystallized from aqueous ethanol to give 5.4 g. of 3-amino-5-p-methoxyphenylisoxazole as needles melting at 171–172° C. Yield: 48%.

*Analysis.*—Calculated for $C_{10}H_{10}O_2N_2$: C, 63.15; H, 5.30; N, 14.73. Found: C, 62.68; H, 5.30; N, 14.54.

What is claimed is:
1. A process for preparing a compound having the formula

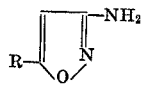

wherein R is hydrogen, alkyl of 1–5 carbon atoms, phenyl, or phenyl substituted by nitro, amino, lower alkyl, lower alkoxy, or halo, which comprises reacting a compound having the formula

wherein R is as defined above with hydroxylamine in the presence of an alkali metal hydroxide.

References Cited

UNITED STATES PATENTS

| | | | |
|---|---|---|---|
| 3,296,071 | 1/1967 | Wright | 260—307 |
| 2,288,863 | 7/1942 | Wenner | 260—307 |
| 3,196,161 | 7/1965 | Nakagawa et al. | 260—307 |

OTHER REFERENCES

Weygand et al., Annalen der Chemie, vol. 459 (1927), pp. 130–2.

ALEX MAZEL, *Primary Examiner.*

R. J. GALLAGHER, *Assistant Examiner.*

U.S. Cl. X.R.

260—239.9, 999